US007979566B2

(12) United States Patent
Doty et al.

(10) Patent No.: US 7,979,566 B2
(45) Date of Patent: Jul. 12, 2011

(54) STREAMING OBJECT INSTANTIATION USING BOOKMARKS

(75) Inventors: John David Doty, Seattle, WA (US); Jeffrey C. Schlimmer, Redmond, WA (US); Christopher Lee Anderson, Redmond, WA (US); Martin James Gudgin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 12/020,427

(22) Filed: Jan. 25, 2008

(65) Prior Publication Data

US 2009/0193136 A1 Jul. 30, 2009

(51) Int. Cl.
*G06F 15/16* (2006.01)
(52) U.S. Cl. ........ 709/229; 709/201; 709/213; 709/218; 709/238
(58) Field of Classification Search .................. 709/201, 709/213, 218, 229, 238
See application file for complete search history.

(56) References Cited

U.S. PATENT DOCUMENTS

| | | | | |
|---|---|---|---|---|
| 6,405,199 B1 * | 6/2002 | Carter et al. | ...................... | 707/6 |
| 6,741,608 B1 | 5/2004 | Bouis et al. | | |
| 6,850,950 B1 | 2/2005 | Clarke et al. | | |
| 6,880,125 B2 | 4/2005 | Fry | | |
| 6,950,866 B1 | 9/2005 | Lowry et al. | | |
| 7,020,666 B2 | 3/2006 | Doise et al. | | |
| 7,111,016 B2 | 9/2006 | Gurevich | | |
| 2003/0182625 A1 | 9/2003 | Davidov et al. | | |
| 2005/0289236 A1 * | 12/2005 | Hull et al. | ..................... | 709/231 |
| 2007/0136435 A1 * | 6/2007 | Lee et al. | ...................... | 709/213 |
| 2007/0169011 A1 | 7/2007 | Ramani et al. | | |
| 2008/0086484 A1 * | 4/2008 | Darnell et al. | .................. | 707/10 |

FOREIGN PATENT DOCUMENTS

WO WO03101072 A1 12/2003

OTHER PUBLICATIONS

Application Management Overview (7 pages) http://msdn2.microsoft.com/en-us/library/ms743714.aspx.
How to: Create Custom Silverlight Controls (5 pages) http://www.silverlight.net/QuickStarts/BuildUi/CustomControl.aspx.

* cited by examiner

*Primary Examiner* — Djenane M Bayard
(74) *Attorney, Agent, or Firm* — Workman Nydegger (57) ABSTRACT

Bookmarking of tokens in a set of streaming tokens, each representing an instantiation instruction or instantiation context. A navigator receives a set of streaming tokens, and provides the tokens to the instantiation manager. However, if the navigator receives an instruction to bookmark a particular token, the navigator buffers the set of streaming instructions at least beginning at the bookmarked token (and possible even earlier if there were prior bookmarks). The navigator replays the set of streaming tokens beginning at a bookmark in response to an instruction from an instantiation manager. The instantiation manager receives the set of streaming tokens. If the instantiation manager is not presently capable of handling the instruction of a particular token, the instantiation manager instructs the navigator to bookmark the particular token. When the instantiation manager later receives a token that permits the instantiation manager to return to the bookmark, the instantiation manager returns to the bookmark to replay the instantiation instructions beginning at the bookmark.

20 Claims, 4 Drawing Sheets

STREAMING OBJECT INSTANTIATION USING BOOKMARKS

BACKGROUND

Object instances may be created from streaming data. For instance, an object instantiation manager may have access to a variety of class definitions. The streaming data provides instructions that drive the instantiation manager to instantiate objects of particular classes. The streaming data further provides instructions on how to instantiate and how to populate those objects. When instantiating directly from streaming data without buffering, the instructions should be written in a manner that the instantiation manager has all the information needed to respond to each instruction as the instructions are received. Alternatively, the instantiation manager may buffer the streaming data until all of the instructions are received. For example, if the instantiation instructions are represented using markup, all of the markup document is buffered.

BRIEF SUMMARY

Embodiments described herein relate to the bookmarking of tokens in a set of streaming tokens, each representing an instantiation instruction. A navigator receives a set of streaming tokens, and provides the tokens to an instantiation manager. However, if the instantiation manager asks the navigator to bookmark a particular token, the navigator buffers the set of streaming instructions at least beginning at the bookmarked token (and possible even earlier if there were prior bookmarks). The navigator replays the set of streaming tokens beginning at a bookmark in response to an instruction from the instantiation manager.

The instantiation manager receives the set of streaming tokens. If the instantiation manager is not presently capable of handling the instruction of a particular token, the instantiation manager instructs the navigator to bookmark the particular token. When the instantiation manager later receives a token that permits the instantiation manager to return to the bookmark, the instantiation manager returns to the bookmark to replay the instantiation instructions beginning at the bookmark.

This permits an instantiation manager to properly comply with the collection of instantiation instructions without requiring that all of the instantiation instructions be buffered. Furthermore, the instantiation manager may process the stream of instantiation tokens without necessarily being able to process every token as it is received.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of embodiments thereof are illustrated in the appended drawings. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

In accordance with embodiments described herein, bookmarking of tokens in a set of streaming tokens is described, wherein each token represents an instantiation instruction or at least provides instantiation context. A navigator receives a set of streaming tokens and provides the tokens to the instantiation manager. However, if the navigator is asked to bookmark a particular token, the navigator buffers the set of streaming instructions at least beginning at the bookmarked token (and possible even earlier if there were prior bookmarks). The navigator replays the set of streaming tokens beginning at a bookmark in response to an instruction from an instantiation manager.

First, after some introductory discussion regarding computing systems in general, a basic computing system will be described with respect to FIG. 1. Then, various embodiments of the use of bookmarking in the context of instantiating objects based on streaming data will be shown and described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
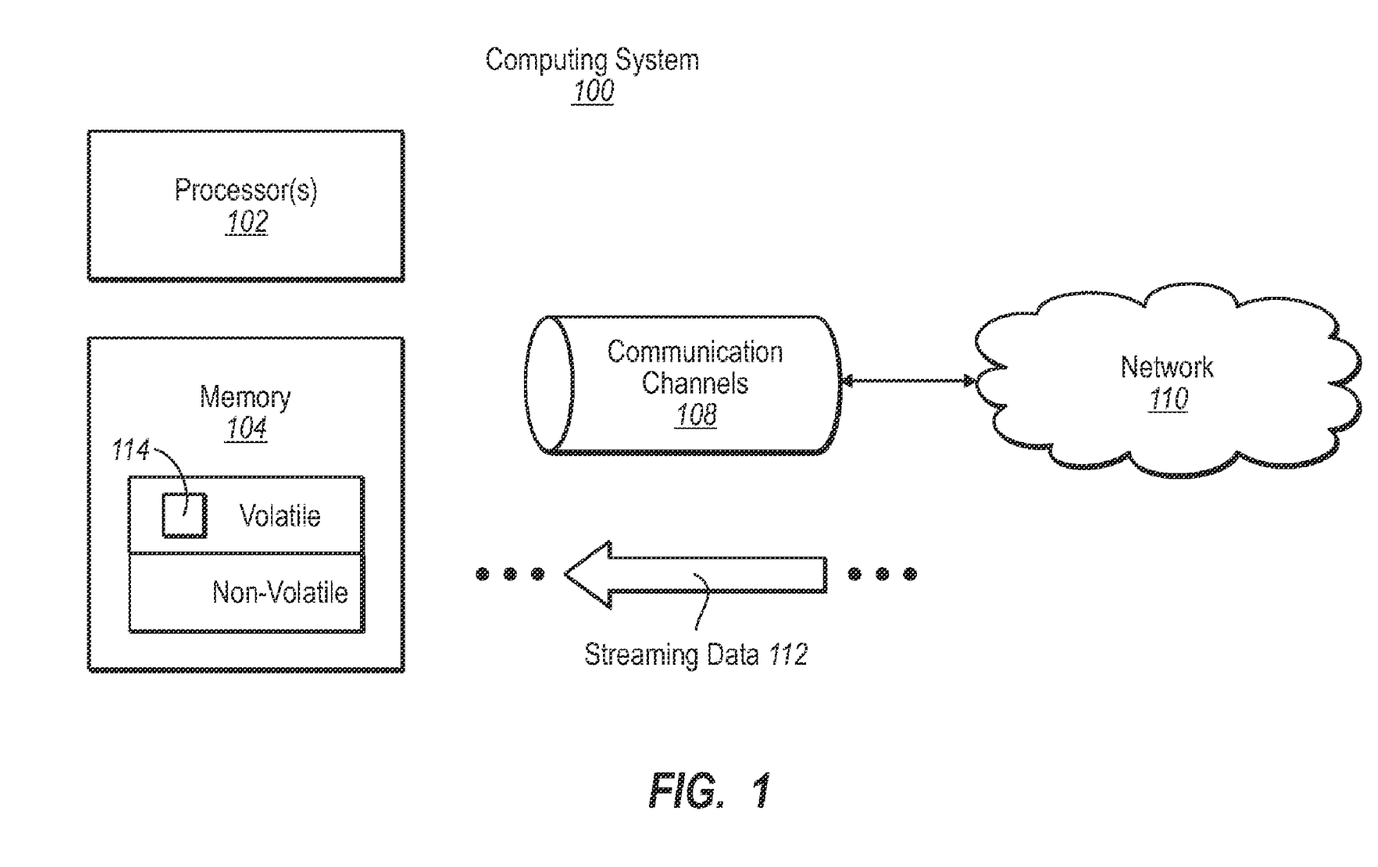
FIG. 1 illustrates a example computing system that may operate to transmit streaming data.

Referring to FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

In FIG. 1, the computing system 100 is shown receiving streaming data 112 over the communication channel 108. The streaming data 112 represents object instantiation instructions that will cause the processors 102 to instantiate one or more objects in memory 104. In particular, object 114 is shown as instantiated within the volatile portion of memory 104. The object 114 may have been instantiated in response to the streaming data 112. The streaming data may be received over a network as shown in FIG. 1, but may also be received over any other data channel. For instance, streaming data may be acquired from a local disk, memory stick, optical disk drive, or the like. More regarding this process will be described with reference to FIG. 2 and subsequent figures, and with respect to several detailed, but non-limiting examples.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
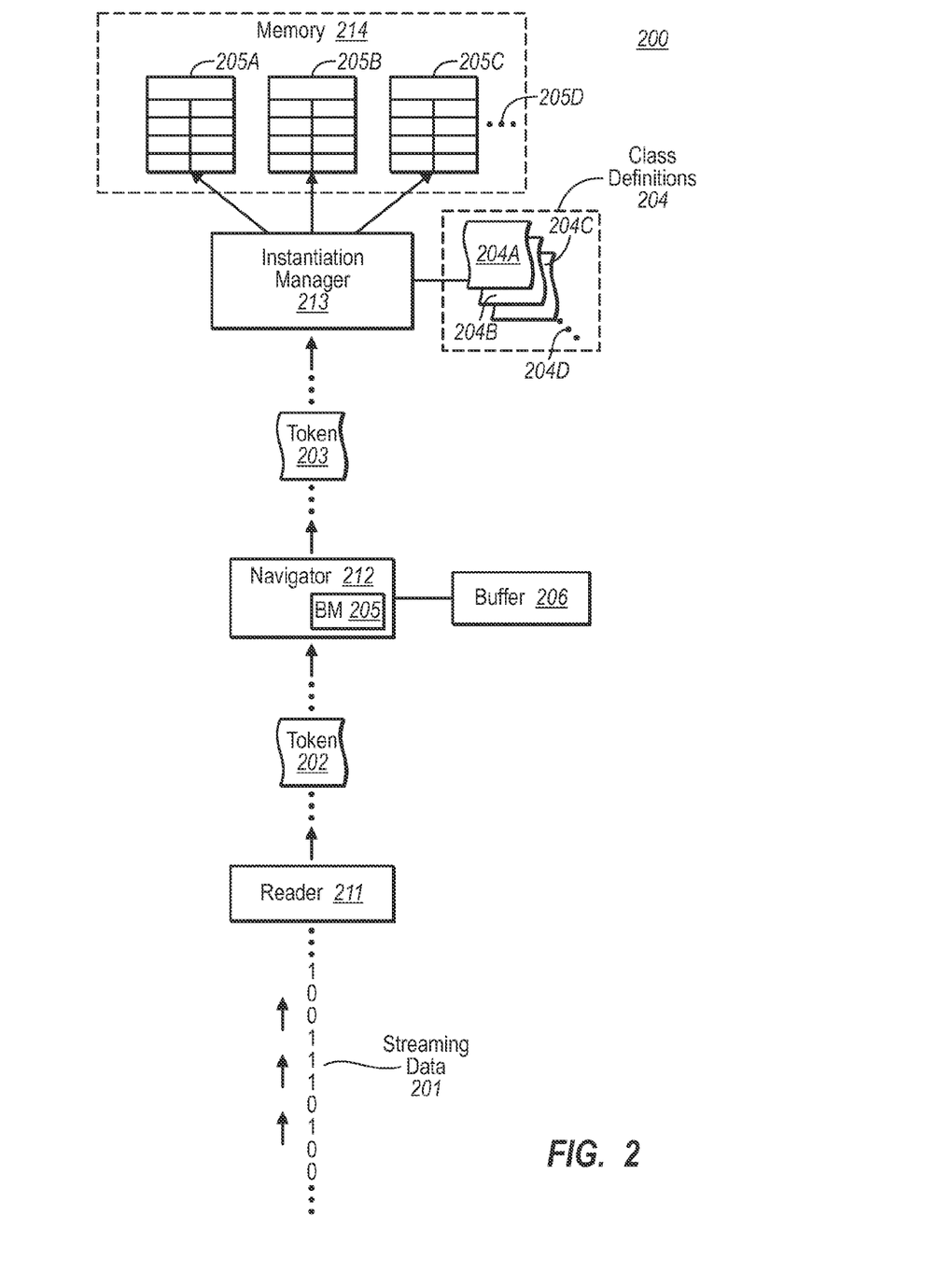
FIG. 2 illustrates a software architecture in which streaming data is used to instantiate objects in a memory.

FIG. 2 illustrates a software architecture 200 in which streaming data is used to instantiate objects in a memory. At the physical layer, the streaming data is simply a sequence of digital bits represented in some physical form, such as electrical or optical signals. The streaming data 201 is illustrated as being a binary sequence of binary ones and binary zeros.

The reader 211 may be implemented in hardware, software, firmware, or a combination thereof In one embodiment, the reader 211 itself is an object instantiated in a memory. The reader 211 contains logic that converts the received data stream 201 into a sequence of tokens 202, each representing instantiation context, and some representing instantiation instructions.

This conversion process may be performed in several steps. For instance, if the set of instantiation instructions represented by the data stream 201 is a markup language document (e.g., an eXtensible Markup Language (XML) document), the tokens may represents the beginning of a particular element, the end of a particular element, the content of an element, the attribute of an element, or the like. The reader 211 may thus first convert each bit sequence segment into a particular character. For instance, for bit sequences that represent ASCII characters, each bit sequence might be 8 bits. However, characters may be represented by other bit sequence lengths as well, as is the case with Unicode characterters or perhaps other character sets. The reader 211 may then parse the character stream to find logical sections (i.e., tokens) that represent logical portions of the hierarchical markup language document. The reader 211 may also perform any flow control and limited buffering to provide the token stream 202.

The navigator 212 may also be implemented as a component in hardware, software, firmware, or a combination. In one embodiment, the navigator 212 itself may be an object instantiated in memory. The navigator 212 receives the tokens 202 from the reader 211. The reader 211 may provide the tokens 202 to the navigator 212 in a push fashion. However, in order to reduce or eliminate buffering requirements, and in the various examples discussed in detail below, the navigator 212 receives tokens from the reader 211 one at a time in a pull fashion in response to an explicit navigator request for each token.

The navigator 212 includes a bookmarking mechanism 205 that permits the navigator to bookmark the token stream 203. The navigator 212 provides the token stream 203 to the instantiation manager 213, which actually instantiates the objects in memory 214. The tokens provided in the token stream 203 provided to the instantiation manager 213 are the same tokens as the tokens provided in the token stream 202 to the navigator 212. However, as described below, due to the bookmarking mechanism 205, these tokens may be provided in a different order in the token stream 203 as compared to the token stream 202. The instantiation manager 213 may cause bookmarks to be created by the navigator 212 in the token stream 202. Each bookmark represents a particular token that is to be later returned to, which simulates a replay of the token stream beginning at that bookmarked token. The navigator 212 may replay the token stream by buffering the token stream in a buffer 206 beginning at the bookmark. The buffered token stream may later be released when the bookmark is released and the token stream is replayed from the buffer.

The instantiation manager 213 actually instantiates objects in memory 214 in response to the instantiation instructions represented by the token stream 202 it receives from the navigator 212. The term "token stream" is used loosely with respect to the token sequence provided from the navigator 212 to the instantiation manager 213, since the instantiation manager 213 may return to replay prior portions of the token stream. The instantiation manager 213 may also be implemented in hardware, software, firmware or a combination, and may even be an object instantiated in memory, and perhaps in the same memory 214 into which it is instantiating objects.

The instantiation manager 213 has access to a collection of class definitions 204. In the illustrated example, the instantiation manager 213 has access to three particular class definitions 204A, 204B, 204C. However, the instantiation manager 213 may have access to any number (one or more) or class definitions as represented symbolically using the ellipses 204D. The instantiation manager 213 may instantiate any number of objects in memory 214. For instance, the instantiation manager is illustrated as having instantiated three objects 205A, 205B, and 205C in memory, although the instantiation manager 213 may instantiate any number of objects in the memory as represented by the ellipses 205D. The object instances may be allocated in the memory in accordance with the corresponding class definition for that object.

Figure 3:
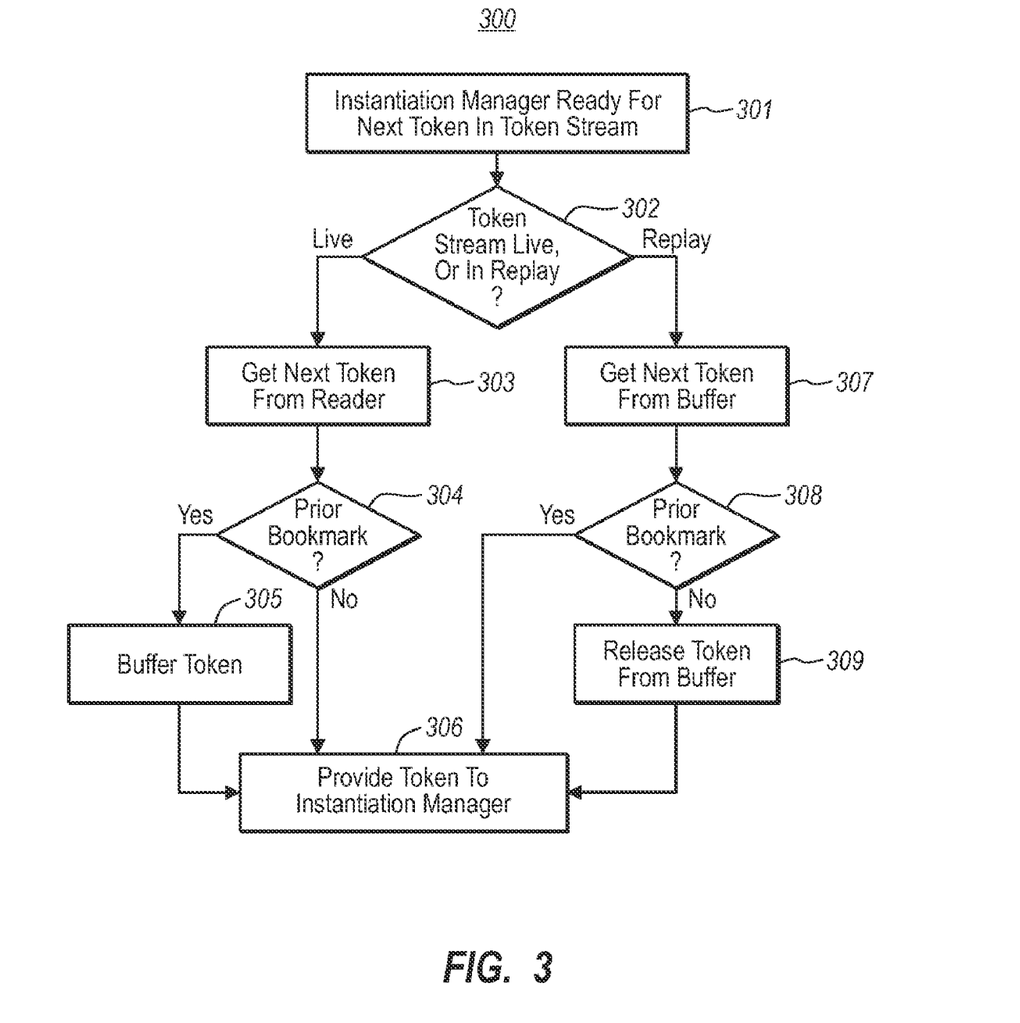
FIG. 3 illustrates a flowchart for a method for a navigator to facilitate instantiation of objects in response to steaming tokens.

FIG. 3 illustrates a flowchart for a method 300 for a navigator to facilitate instantiation of objects in response to steaming tokens. The method 300 may be performed each time the navigator determines that the instantiation manager is ready for a next token in the token stream (act 301). Recall that each token in the token stream represents some instantiation context for the instantiation manager.

The token stream provided from the navigator to the instantiation manager may be a live token stream, in which the navigator provides tokens as they are received from the reader. However, the token stream may also be in replay mode, in which case, the navigator provides tokens from its buffer to the instantiation manager. For the first token in a particular token stream, the token stream will be live ("Live" in decision block 302).

In the case of a Live token stream ("Live" in decision block 302), the navigator gets the next token of the stream from the reader (act 303). In a pull mechanism, the navigator may explicit make a request for the next token from the reader, and receive the token as a response to that request. If there is a prior bookmark set in the token stream (Yes in decision block 304), then the navigator buffers the token just acquired from the reader (act 305), and also provides the token to the instantiation manager (act 306). It is also possible to provide the token to the instantiation manager prior to buffering. Accordingly, there is no relative timing requirement with respect to acts 305 and 306. If there is not a prior bookmark set in the token stream (No in decision block 304), then the navigator provides the token to the instantiation manager (act 306) without having to buffer the token.

In one embodiment, the buffer 206 is implemented as a singly linked list, with each token in the buffer begin associated with a node in the singly linked list. Except for the final node in the singly linked list, each node also includes a link to the next node in the list. All bookmarks that use the token stream share the linked list. In the case of a live token stream ("Live" in decision block 302), if there is no prior bookmark ("No" in decision block 304), then there are no tokens in the buffer and the linked list will have a length of zero. However, in the case of a live token stream ("Live" in decision block 302), with there being a prior bookmark ("Yes" in decision block 304), then the token is added to the singly linked list by creating an additional node in the list, and linking the previous last node in the list to the newly created additional node.

In the case of a Replay token stream ("Replay" in decision block 302), on the other hand, the navigator provides the next token from its buffer (act 307), rather than having to get the next token from the reader. If there is a prior bookmark in the token stream (Yes in decision block 308), then the navigator provides the token from its buffer to the instantiation manager (act 306). If there is not a prior bookmark in the token stream (No in decision block 308), then the navigator is free to (but need not necessarily) free up the memory associated with buffering that token (act 309) before, concurrent with and/or after providing the token to the instantiation manager (act 360). In the linked list embodiment, as the navigator replays the tokens from the buffer, the navigator advances the bookmark that caused the replay to the next token in the linked list. If the bookmark is the earliest bookmark in the linked list, then the bookmark advances passed tokens that will not be accessed again. A garbage collection module may periodically detect such unused modules in the linked list, and may remove those tokens from the linked list.

Figure 4:
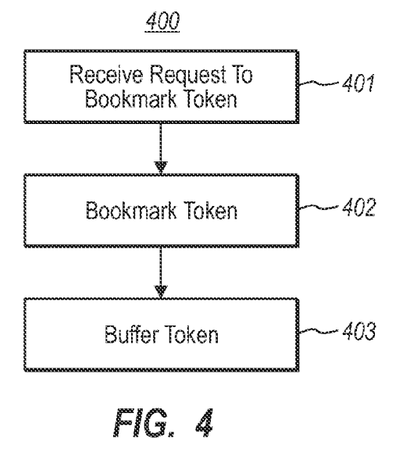
FIG. 4 illustrates a flowchart of a method that causes the navigator to bookmark tokens.

FIG. 4 illustrates a flowchart of a method 400 that causes the navigator to bookmark tokens. In particular, the bookmarking is initiated upon receiving a request from the instantiation manager to bookmark a particular token (act 401). The navigator may then bookmark the token (act 402), and also begin buffering with that token (act 403). Of course, this bookmarking may affect the flow of the method 300 of FIG. 3 for subsequent tokens received while that bookmark is in effect.

Figure 5:
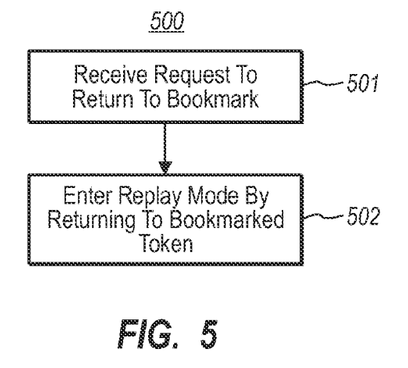
FIG. 5 illustrates a flowchart of a method that may cause the navigator to enter replay mode, replaying the token stream from a prior bookmark.

FIG. 5 illustrates a flowchart of a method 500 that may cause the navigator to enter replay mode, replaying the token stream from a prior bookmark. Specifically, the navigator receives a request from the instantiation manager to replay the streaming tokens beginning at a particular bookmarked token (act 501). The navigator then enters replay mode by returning to the bookmarked token as the next token to be provided to the instantiation manager (act 502).

Figure 6:
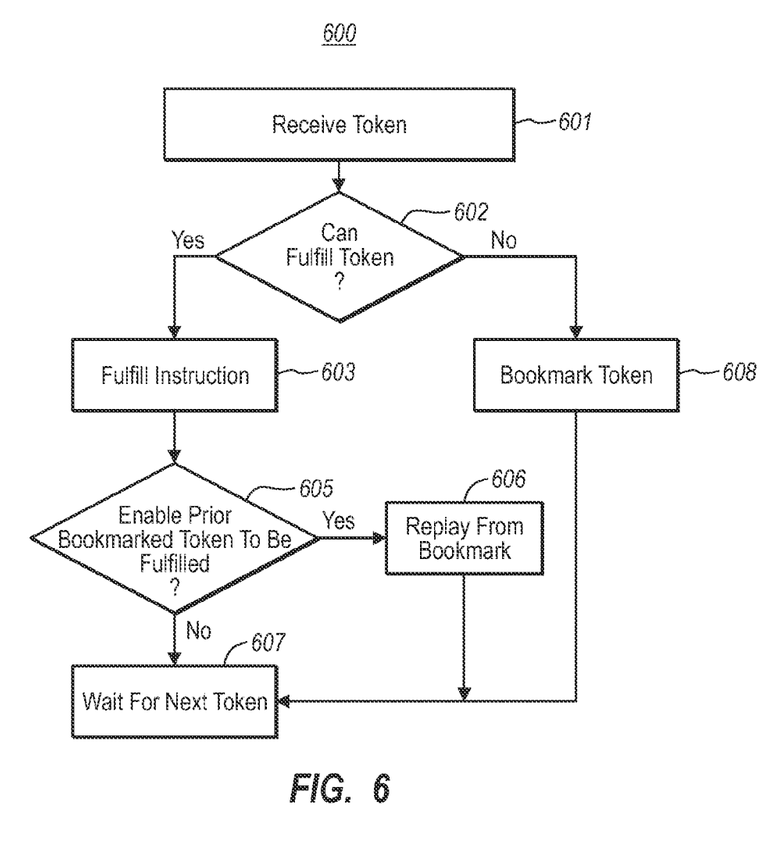
FIG. 6 illustrates a flowchart of a method for an instantiation manager to receive a set of tokens from the navigator.

FIG. 6 illustrates a flowchart of a method 600 for an instantiation manager to receive a set of tokens from the navigator. The method 600 is initiated each time the instantiation manager receives a token from the navigator (act 601). Initially, the instantiation manager decides whether or not it is capable of presently fulfilling any instantiation instruction represented by the received instruction (decision block 602).

If the instantiation manager is capable of presently fulfilling the instantiation instruction (Yes in decision block 602), the instantiation manager does fulfill the instantiation instruction (act 603). In addition, if there is a prior bookmarked token, and the instantiation instruction enables the instantiation manager to perform a prior bookmarked instantiation token (Yes in decision block 605), then the instantiation manager replays the tokens beginning at that prior bookmarked token (act 606). For instance, the instantiation manager may provide a replay instruction to the navigator, causing the navigator to perform the method 500 of FIG. 5. Otherwise, (No in decision block 605), the instantiation manager simply waits for the next token (act 607) optionally informing the navigator that the instantiation manager is ready for the next token.

If the instantiation manager is not capable of presently fulfilling the instantiation instruction (No in decision block 602), then the instantiation manager bookmarks the present token (act 608). For instance, the instantiation manager may request that the navigator bookmark the token causing the navigator to perform the method 400 of FIG. 4. The instantiation manager then waits for the next token (act 607).

Accordingly, embodiments described herein permit token streams to be replayed when an instantiation manager is not immediately capable of responding to a particular token. The instantiation manager may bookmark that token and return to replay the stream beginning at the token when the instantiation manager becomes ready to receive the instantiation context provided by that bookmarked token.

Two very specific examples will now be provided. In each specific example, class definitions will be provided in C#. In addition, a particular token stream, and associated hierarchical markup language document will be provided to show how the tokens might be handled in accordance with a specific embodiment. These examples are provided for illustrative purposes only. The first example is simpler in that it describes only one level of bookmarking. That first example may be referred to as the "single bookmark" example. The second example is more complex and illustrates several layers of bookmarking, referred to herein as the "multiple bookmark" example.

In the single bookmark example, the goal is to create an object instance of a class following the definition below:

```
public class Monster<TWeapon>
{
    public int SizeInMeters { get; set; }
    public string Name { get; set; }
}
```

The Monster class is a generic class requiring a type argument TWeapon in order to even allocate the Monster class, since the structure of the Monster object will depend on the TWeapon type argument. The following is an example of a deserialized form of the collection of instantiation instructions:

```
<Monster>
    <Monster.SizeInMeters>100</Monster.SizeInMeters>
    <x:TypeArguments>Fire</x:TypeArguments>
    <Monster.Name>Godzilla</Monster.Name>
</Monster>
```

The corresponding token sequence extracted by the reader from the bit stream would appear as follows:
1 StartElement: Monster
2 StartElement: Monster.SizeInMeters
3 Text: 100
4 EndElement: Monster.SizeInMeters
5 StartElement: x:TypeArguments
6 Text: Fire
7 EndElement: x:TypeArguments
8 StartElement: Monster.Name
9 Text: Godzilla
10 EndElement: Monster.Name
11 EndElement: Monster Token 1 is provided from the navigator to the instantiation manager. However, the instantiation manager cannot yet create the Monster object since the type argument TWeapon is not known. Recall that the Monster class in this example is a generic class, and as such, needs a type argument before the structure of the object would even be known. Not yet knowing the structure of the object, the instantiation manager causes the navigator to bookmark token 1, whereupon the navigator buffers token 1. Subsequently, the navigator provides tokens 2, 3 and 4 to the instantiation manager, and the navigator buffers these tokens as well. The instantiation manager still cannot deal with tokens 2-4 since the Monster object is not even yet created, and compliance with these tokens requires the existence of the Monster object.

The navigator then provides token 5 "StartElement: x:TypeArguments" to the instantiation manager, cueing the instantiation manager that it might be about to receive the type argument needed to create the Monster object.

The navigator then provides token 6 "Text: Fire" to the instantiation manager, which tells the instantiation manager that the type argument for the Monster class is "Fire". At this point, or perhaps after the instantiation manager receives token 7 "EndElement: x:TypeArguments", the instantiation manager knows the type argument is "Fire". The instantiation manager instructs the navigator to replay from the prior bookmark, which is at token 1.

When the instantiation manager receives token 1 again, it is to create a Monster object. Now, however, the instantiation manager knows the type argument is to be "Fire". Thus, the instantiation manager creates a Monster<Fire> object. At this stage, token 1 may be released from the buffer since there is only one bookmark using the buffer, and since the bookmark is now to advance to token 2 in the buffer.

When token 2 "StartElement: Monster.SizeInMeters" is subsequently replayed from the navigator buffer, the instantiation manager gets ready to write to the SizeInMeters property of the Monster<Fire> object. At this stage, token 2 may, but need not, be released from the buffer. For instance, the bookmark may be advanced to token 3 in a singly linked list representation of the buffer. Subsequently, the garbage collection module may detect that the nodes in the linked list representing tokens 1 and 2 are no longer in use.

When token 3 "Text: 100" is replayed, the instantiation manager writes the value "100" to the SizeInMeters property of the Monster<Fire> object. Token 3 may then be discarded from the buffer.

When token 4 "EndElement: Monster.SizeInMeters" is subsequently replayed from the navigator buffer, the instantiation manager knows it is complete writing to the SizeInMeters property. Token 4 may then be discarded from the buffer.

When tokens 5 through 7 are replayed from the navigator buffer, the instantiation manager need take no action since the type argument has already been set, and in fact was needed before the Monster<Fire> object could even be created. Tokens 5 through 7 may be discarded from the buffer.

When token 8 "StartElement: Monster.Name" is received by the instantiation manager, we exit the replay mode, and enter live mode, since the navigator is now providing tokens not from its buffer (which is now empty), but from the reader that accesses the bit stream. The instantiation manager gets ready to write to the Name property of the Monster<Fire> object.

When token 9 "Text: Godzilla" is received by the instantiation manager, the value "Godzilla" is written to the Name property of the Monster<Fire> object.

With token 10 "EndElement: Monster.Name", the instantiation manager knows it is done writing to the Name property.

With token 11 "EndElement: Monster", the instantiation manager knows it is done creating and populating the Monster<Fire> object.

Thus, in the single bookmark example, the instantiation manager was permitted to bookmark a token, thereby allowing the instantiation manager to later return to that token when it had the appropriate context for responding to that bookmarked token. Although some buffering was done, the entire set of instantiation instructions was not buffered.

The next example is the multiple bookmark example. In this specific example, there are three relevant class definitions, one for City, one for Country, and a new one for Monster as follows written in C#.

```
public class City
{
    public City(Country country);
    public string Name { get; set; }
    public string Population { get; set; }
}
public class Country
{
    public string Name { get; set; }
}
public class Monster
{
    public Monster(City home);
    public int SizeInMeters { get; set; }
    public Color SkinColor { get; set; }
}
```

Here is the markup we wish to deserialize. Note that in this example, the x:ConstructorArguments contains a serialization of objects that is to be passed to the constructor to create the object.

```
<Monster>
    <Monster.SizeInMeters>100</Monster.SizeInMeters>
    <x:ConstructorArguments>
        <City>
            <City.Name>Tokyo</City.Name>
            <City.Population>12800000</City.Population>
            <x:ConstructorArguments>
                <Country>
                    <Country.Name>Japan</Country.Name>
                </Country>
            </x:ConstructorArguments>
        </City>
    </x:ConstructorArguments>
    <Monster.SkinColor>Green</Monster.SkinColor>
</Monster>
```

The following is its representation as a sequence of tokens:
1 StartElement: Monster
2 StartElement: Monster.SizeInMeters
3 Text: 100
4 EndElement: Monster.SizeInMeters
5 StartElement: x:ConstructorArguments
6 StartElement: City
7 StartElement: City.Name
8 Text: Tokyo
9 EndElement: City.Name
10 StartElement: City.Population
11 Text: 12800000
12 EndElement: City.Population
13 StartElement: x:ConstructorArguments
14 StartElement: Country
15 StartElement: Country.Name
16 Text: Japan
17 EndElement: Country.Name
18 EndElement: Country
19 EndElement: x:ConstructorArguments
20 EndElement: City
21 EndElement: x:ConstructorArguments
22 StartElement: Monster.SkinColor
23 Text: Green
24 EndElement: Monster.SkinColor
25 EndElement: Monster The navigator first determines that the instantiation manager is ready for the first token 1 of the token stream. In an embodiment in which the instantiation manager drives the navigator, the navigator may receive a ready indicator from the instantiation manager. In another embodiment, perhaps the navigator simply does not receive a "Not Ready" indicator from the instantiation manager, causing the navigator to assume that the instantiation manager is ready for the first token 1 of the token stream. Alternatively, the navigator may simply assume that the instantiation manager is always ready without any communication with the instantiation manager.

Upon determining that the instantiation manager is ready, the navigator instructs the reader to get the first token from the token sequence. The reader provides token 1 StartElement: Monster to the navigator. Since the navigator is now providing the token stream live to the instantiation manager, the navigator provides token 1 StartElement: Monster to the instantiation manager.

The instantiation manager refers to the Monster class, which requires a City constructor argument. However, the instantiation manager does not yet have that City constructor argument. Accordingly, the instantiation manager cannot yet fulfill the instantiation instruction represented by token 1. The instantiation manager instructs the navigator to bookmark token 1. Since there are multiple bookmarks to be used in this example, this will be referred to as the "first" bookmark. The navigator maintains the first bookmark at token 1 StartElement: Monster, and buffers token 1. The navigator will continue to buffer subsequent tokens until the bookmark is released. The instantiation manager may also note the event that would allow the instantiation manager to return to the bookmark: namely, that all of the constructor arguments for the Monster class (i.e., the City object) have been created.

The navigator then instructs the reader to get next token from the bit stream. The reader provides token 2 StartElement: Monster.SizeInMeters to the navigator. The navigator buffers this token with token 1, and provides token 2 StartElement: Monster.SizeInMeters to the instantiation manager. The instantiation manager still cannot deal with token 1, because constructor arguments are still needed.

The navigator instructs the reader to get next token from the bit stream. The reader provides token 3 Text: 100 to the navigator. The navigator buffers tokens 1-3, and provides token 3 Text: 100 to the instantiation manager. The instantiation manager still cannot take action since the Monster object is not even created at this point. This process repeats for token 4 EndElement: Monster.SizeInMeters as well.

The navigator instructs the reader to get next token from the bit stream. The reader provides token 5 StartElement: x:ConstructorArguments to the navigator. The navigator buffers tokens 1-5, and provides token 5 StartElement: x:ConstructorArguments to the instantiation manager. The instantiation manager still cannot take action since the Monster object is not even created at this point. The instantiation manager might optionally prepare to create a constructor object.

The navigator instructs the reader to get next token from the bit stream. The reader provides token 6 StartElement City to the navigator. The navigator buffers tokens 1-6, and provides token 6 StartElement City to the instantiation manager. The instantiation manager still cannot take action on the first bookmark at token 1, since the Monster object is not even created at this point. Furthermore, token 6 instructs the instantiation manager to instantiate a City object. The instantiation manager refers to the City class, but cannot instantiate a City object yet because a Country constructor is needed. Accordingly, the instantiation manager instructions the navigator to create yet another bookmark (a "second" bookmark) at token 6 StartElement: City. Thus, there are now two bookmarks in the token stream, a first bookmark at token 1 StartElement: Monster, and a second bookmark at token 6 StartElement: City. The navigator then creates the second bookmark. The instantiation manager may also note the event that would allow the instantiation manager to return to the second bookmark: namely, that the Country object is created and populated.

The navigator instructs the reader to get next token from the bit stream. The reader provides token 7 StartElement: City.Name to the navigator. The navigator buffers tokens 1-7, and provides token 7 StartElement: City.Name to the instantiation manager. The instantiation manager still cannot take action on the first bookmark at token 1 StartElement: Monster since the Monster object is not even created at this point. Furthermore, the instantiation manager cannot take action on the second bookmark at token 6 StartElement: City since the City object is not yet created since the Country constructor argument is needed. This process repeats for tokens 8 Text Tokyo, 9 EndElement City.Name, 10 StartElement: City.Population, 11 Text: 12800000, and 12 EndElement: City.Population. Each is provided from the navigator to the instantiation manager as a live token stream, each being buffered by the navigator, and with the instantiation manager not able to do anything with them since the Monster and City objects have not yet been created.

When the navigator provides token 13 StartElement: x:ConstructorArguments to the instantiation manager, the instantiation manager is cued that constructor arguments for the City class are about to be provided. The navigator buffers tokens 1-13 at this stage.

The navigator instructs the reader to get the next token from the bit stream. The reader provides token 14 StartElement: Country to the navigator. The navigator buffers tokens 1-14, and provides token 14 StartElement: Country to the instantiation manager. The instantiation manager is instructed by this token to instantiate a Country object. The Country class is referred to. There are no constructors, type arguments, or any other information needed before the Country object can be allocated. Accordingly, the instantiation manager allocates the Country object in memory as defined by the Country class.

The navigator instructs the reader to get the next token from the bit stream. The reader provides token 15 StartElement: Country.Name to the navigator. The navigator buffers tokens 1-15, and provides token 15 StartElement: Country.Name to the instantiation manager. The instantiation manager gets ready to write a value to the Name property of the newly instantiated Country object.

The navigator instructs the reader to get the next token from the bit stream. The reader provides token 16 Text: Japan to the navigator. The navigator buffers tokens 1-16, and provides token 16 Text: Japan to the instantiation manager. The instantiation manager writes the value "Japan" to the Name property of the Country object.

The reader provides token 17 EndElement: Country.Name to the navigator. The navigator buffers tokens 1-17, and provides the token 17 to the instantiation manager. The instantiation manager notes that it is now completed writing to the Name property of the Country object.

The reader provides token 18 EndElement: Country to the navigator. The navigator buffers tokens 1-18, and provides the token 18 to the instantiation manager. The instantiation manager notes that it is now completed the instantiation and population of the Country object. The instantiation manager now has the Country object to use as a constructor for the City object, and could now create the City object. This is the event that would allow the instantiation manager to return to the second bookmark. The instantiation manager instructs the navigator to replay the token stream beginning at the last bookmark, which would be the second bookmark at token 6.

The second bookmark is then removed, leaving only the first bookmark at token 1 StartElement: Monster.

Without requiring any information from the reader, the navigator provides token 6 StartElement: City from its buffer to the instantiation manager. The instantiation manager notes that it has all of the constructor arguments for the City class, and thus instantiates a City object. The instantiation manager still cannot deal with token 1, because even though the City object is instantiated, it is not yet prepared sufficiently to be used as a constructor argument for a Monster object.

The navigator then provides token 7 StartElement: City.Name from its buffer to the instantiation manager. The instantiation manager gets ready to write to the Name field of the City object.

The navigator then provides token 8 Text: Tokyo from its buffer to the instantiation manager. The instantiation manager writes "Tokyo" as the value of the Name field of the City object.

The navigator then provides token 9 EndElement: City.Name from its buffer to the instantiation manager. The instantiation manager notes that the value write operation for the Name property is complete.

The navigator then provides token 10 StartElement: City.Population from its buffer to the instantiation manager. The instantiation manager gets ready to write a value to the Population field of the City object.

The navigator then provides token 11 Text: 12800000 from its buffer to the instantiation manager. The instantiation manager writes the value "12800000" to the Population property of the City object.

The navigator then provides token 12 EndElement: City.Population from its buffer to the instantiation manager. The instantiation manager notes that the write operation to the Population property is complete.

The navigator then provides token 13 Start Element: x:ConstructorArguments from its buffer to the instantiation manager. The instantiation manager gets ready to populate the City object with constructor argument(s).

The navigator then provides token 14 Start Element: Country from its buffer to the instantiation manager. The instantiation manager has the Country object already created, and thus populates the City object with that Count object.

The navigator provides tokens 14-18 in sequence from its buffer to the instantiation manager. However, the instantiation manager has already performed the actions required of these tokens since the Country object had already been created. Accordingly, no particular action is required of tokens 14-18. In one embodiment, when action is taken on a particular token, that token may be flagged as complete so that the navigator does not even provide that token when the token stream is replayed to the instantiation manager. In this case, for example, tokens 14-18 might have been flagged. Alternatively, the instantiation manager may see the flag and attempt to take no action.

The navigator then prepares to send the next token (token 19) to the instantiation manager. However, the navigator only has tokens 1-18 buffered at this stage. The navigator thus exits replay mode and once again enters live mode. The navigator thus requests the next token from the reader. The reader provides token 19 EndElement: ConstructorArguments to the navigator. The navigator buffers tokens 1-19 (since there is still a prior bookmark), and provides token 19 to the instantiation manager. The instantiation manager notes that the constructor arguments are completed for the City object.

The reader provides token 20 EndElement: City to navigator. The navigator buffers tokens 1-20, and provides token 20 to the instantiation manager. The instantiation manager notes that the City object is now complete. Since the City object is complete, the Instantiation manager is now ready to deal with token 1, which required the City object as a constructor argument. The instantiation manager may note that the even corresponding to a return to the first bookmark has occurred. The instantiation manager instructs the navigator to replay from the last bookmark, which is the first bookmark at token 1 StartElement: Monster, since the second bookmark at token 6 had previously been deleted.

The Navigator replays from token 1, and deletes the first token. The navigator provides token 1 StartElement: Monster from its buffer to the instantiation manager. The instantiation manager refers to the Monster class, and notes that it now contains all constructor arguments (i.e., the City object) for the Monster class, and thus allocates a Monster object. Optionally, since there are no more bookmarks in the token stream, the navigator may release each token from its buffer as the token is provided to the instantiation manager. Alternatively, the navigator might release the entire buffer once the replay of the buffer is complete and the navigator once again enters live mode with no bookmarks remaining in the token stream.

The navigator provides token 2 StartElement: Monster.SizeInMeters from its buffer to the instantiation manager. The instantiation manager gets ready to write a value to the SizeInMeters property of the Monster object. Optionally, token 2 is then released from the buffer, although as previously mentioned, the buffer may be released later.

The navigator provides token 3 Text: 100 from its buffer to the instantiation manager. The instantiation manager writes the value "100" to the SizeInMeters property of the Monster object.

The navigator provides token 4 EndElement: Monster.SizeInMeters from its buffer to the instantiation manager. The instantiation manager notes that it is done writing to the SizeInMeters property of the Monster object.

The navigator provides token 5 StartElement: x:ConstructorArguments from its buffer to the instantiation manager. The instantiation manager gets ready to populate the Monster object with constructor argument(s).

The Navigator provides token 6 StartElement: City from its buffer to the instantiation manager. The instantiation manager populates the Monster object with the City object.

The navigator in turn provides tokens 7-20 one at a time from its buffer to the instantiation manager. The instantiation manager essentially takes no action in response to tokens 7-20 since the City object has already been constructed. Since the navigator replayed all of the tokens in its buffer (i.e., tokens 1-20), the navigator is no longer buffering tokens, and is now entering live mode, in which new tokens are acquired from the reader.

The navigator requests that the reader provide the next token in the bit stream. The reader provides token 21 EndElement: x:ConstructorArguments to the Navigator. The navigator is in live mode with no bookmarks presently in the token stream. Accordingly, there is no need to buffer token 21. Instead, the navigator provides token 21 to the instantiation manager without buffering. The instantiation manager notes that the constructor arguments are complete for the Monster object.

The reader provides token 22 StartElement: Monster.SkinColor to the navigator, which the navigator relays without buffering to the instantiation manager. The instantiation manager gets ready to write a value to the SkinColor property of the Monster object.

The reader provides token 23 Text: Green to the navigator, which the navigator relays without buffering to the instantiation manager. The instantiation manager writes the value "Green" to the SkinColor property of the Monster object.

The reader provides token 24 EndElement: Monster.SkinColor to the navigator, which the navigator relays without buffering to the instantiation manager. The instantiation manager notes that it is complete the value write operation to the SkinColor property.

The reader provides token 25 EndElement: Monster to the navigator, which the navigator relays without buffering to the instantiation manager. The instantiation manager notes that it is complete the creation of the Monster object. The instantiation manager is also completed responding to all of the instantiation instructions of the token stream.

Although some buffering was performed, the buffering was of less than all of the tokens in the token stream. Using the embodiments described herein, some token streams may be evaluated while buffering only a small fraction of the entire token stream, even though the token stream is not written in such a way that the instantiation manager always knows how to handle a particular instantiation token. Accordingly, buffering requirements of instantiation based on token streams is reduced without requiring any special structural requirements of the token stream.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a streaming token navigator to provide a set of streaming tokens to an instantiation manager, the set of streaming tokens representing a collection of instantiation instructions, the method comprising: at a computing system with a navigator and an instantiation manager, using one or more processors in executing instructions causing the computing system to perform the following: the navigator receiving a particular token representing an instantiation instruction; the navigator initially providing the particular token to the instantiation manager; the navigator receiving a request from the instantiation manager to bookmark the set of streaming tokens at the particular token, wherein the bookmark indicates that the navigator is to buffer the set of streaming tokens at least beginning at the particular token; the navigator receiving one or more subsequent tokens of the set of streaming tokens; the navigator buffering the particular token and the one or more subsequent tokens; the navigator initially providing the one or more subsequent tokens to the instantiation manager; after the navigator initially provides the one or more subsequent tokens to the instantiation manager, the navigator receiving a request from the instantiation manager to replay the set of streaming tokens beginning at the particular token; and in response to the request from the instantiation manager to replay, the navigator replaying the particular token and the one or more subsequent tokens to the instantiation manager in their proper order within the set of streaming tokens.

2. The method of claim 1, wherein the particular token is a first token of the set of streaming tokens.

3. The method of claim 1, wherein the particular token is an intermediate token of the set of streaming tokens.

4. The method of claim 3, further comprising the following prior to the the navigator initially providing the particular token to the instantiation manager; the navigator receiving a prior token in the set of steaming tokens; the navigator initially providing the prior token to the instantiation manager; the navigator receiving a request from the instantiation manager to bookmark the set of streaming data at the prior token, wherein the bookmark indicates that the navigator is to buffer at least beginning at the prior token; and the navigator buffering the prior token, and any intervening tokens between the prior token and the particular token in the stream of tokens.

5. The method of claim 4, further comprising the following after the navigator replaying the particular token and the one or more subsequent tokens: the navigator receiving a request from the instantiation manager to replay the set of streaming tokens beginning at the prior token; and in response to the request from the instantiation manager to replay beginning at the prior token, the navigator replaying the prior token, any intervening tokens between the prior token and the particular token, the particular token, and the one or more subsequent tokens to the instantiation manager.

6. The method of claim 5, further comprising the following after and/or concurrent with replaying beginning at the prior token: releasing the buffer that included the prior token, any intervening tokens between the prior token and the particular token, the particular token, and the one or more subsequent tokens.

7. The method of claim 1, further comprising the following after and/or concurrent with replaying beginning at the particular token: releasing the buffer that included the prior token, any intervening tokens between the prior token and the particular token, the particular token, and the one or more subsequent tokens.

8. A method for an instantiation manager to receive a set of tokens from a navigator that receives the set of tokens as streaming tokens, the set of tokens representing a collection of instantiation instructions, the method comprising: at a computing system with a navigator and an instantiation manager, using one or more processors in executing instructions causing the computing system to perform the following: the instantiation manager receiving a particular token of the set of tokens from a navigator that is configured to receive the set of tokens as streaming tokens, the particular token represent an instantiation instruction; the instantiation manager determining that the instantiation manager cannot yet act upon the instantiation instructions represented by the particular token; an act of the instantiation manager instructing the navigator to bookmark the set of tokens at the particular token; the instantiation manager receiving one or more subsequent tokens of the set of tokens from the navigator; determining that a final token of the one or more subsequent tokens permits the instantiation manager to act upon instantiation instructions represented by the particular token; and replaying the set of tokens beginning at the particular bookmarked token.

9. The method of claim 8, wherein each token in the set of tokens comprises a portion of a markup language document.

10. The method of claim 8, wherein the particular token represents an instruction to instantiate an object of a particular class, wherein the instantiation manager determining that the instantiation manager cannot yet act upon the instantiation instructions represented by the particular token comprises the following: determining that there is one or more items of information needed before the object of the particular class can be allocated.

11. The method of claim 10, wherein the particular class is a generic class, the one or more items of information at least comprising a type argument that permits a specific class of the generic class to be identified.

12. The method of claim 10, wherein the one or more items of information at least comprises one or more constructor arguments.

13. The method of claim 8, wherein each of the set of streaming tokens represent instantiation context, but not all of the set of streaming tokens represents an actual instantiation instruction.

14. The method of claim 8, wherein replaying the set of tokens beginning at the particular bookmarked token comprises: the instantiation manager instructing the navigator to replay the set of tokens beginning at the particular token; the instantiation manager receiving a replay of the set of tokens beginning at the particular token from the navigator; and the instantiation manager complying with instantiation instructions received from the navigator as the instantiation manager receives a replay of the set of tokens beginning at the particular token.

15. The method of claim 8, wherein the navigator buffers less than all of the set of tokens.

16. A computer program product comprising: one or more computer-readable storage media having stored thereon computer-executable instructions that, when executed by one or more processors of a computing system, cause the computing system to instantiate a navigator and an instantiation manager, wherein the navigator is configured to receive a set of streaming tokens, and provide the set of streaming tokens to the instantiation manager, the navigator further being configured to bookmark the set of streaming tokens even in the middle of the set of streaming tokens, and configured to replay the set of streaming tokens beginning at a bookmark; and wherein the instantiation manager is configured to perform the following for each token received from the navigator: determine whether the instantiation manager can fulfill instantiation instructions represented by the received token; when the instantiation manager can fulfill the instantiation instructions, fulfilling the instantiation instruction; and when the instantiation manager cannot fulfill the instantiation instruction, instructing the navigator to bookmark the token, whereupon when the instantiation manager receives a subsequent token that permits the navigator to fulfill the instantiation instruction represented by the bookmarked token, the instantiation manager fulfills the instantiation instruction represented by the bookmarked token, and replays the subsequent tokens in the set of streaming tokens.

17. The computer program product of claim 16, wherein the one or more computer-readable storage media are physical memory.

18. The computer program product of claim 16, wherein the navigator is further configured to control a buffer into which less than all of the tokens of the set of tokens may be buffered in response to bookmark instructions from the instantiation manager.

19. The computer program product of claim 16, wherein the instantiation manager has accessed to a collection of class definitions.

20. The computer program product of claim 16, wherein the computer-readable media further have thereon the class definitions, and wherein: the set of streaming tokens are received sequentially in the stream; after fulfilling the instantiation instruction in response to determining that the instantiation manager is capable of presently fulfilling the instantiation instruction, determining to enable a token prior to the received token to be fulfilled and replaying the token prior to the received token.

* * * * *